(12) United States Patent
Wiegand

(10) Patent No.: US 10,769,224 B2
(45) Date of Patent: Sep. 8, 2020

(54) SPACE WEATHER DATABASE

(71) Applicant: United States of America as represented by NASA, Washington, DC (US)

(72) Inventor: Chiu P. Wiegand, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 315 days.

(21) Appl. No.: 15/674,016

(22) Filed: Aug. 10, 2017

(65) Prior Publication Data
US 2019/0050485 A1     Feb. 14, 2019

(51) Int. Cl.
| | |
|---|---|
| *G06F 16/00* | (2019.01) |
| *G01W 1/10* | (2006.01) |
| *G06F 16/9535* | (2019.01) |
| *G06F 16/9038* | (2019.01) |

(52) U.S. Cl.
CPC ........... *G06F 16/9535* (2019.01); *G01W 1/10* (2013.01); *G06F 16/9038* (2019.01)

(58) Field of Classification Search
CPC ... G06F 16/9535; G06F 16/9038; G01W 1/10
IPC .................................. G06F 16/00; G01W 1/10
See application file for complete search history.

(56) References Cited

U.S. PATENT DOCUMENTS

| | | | | |
|---|---|---|---|---|
| 6,356,842 | B1 * | 3/2002 | Intriligator | G01W 1/10 |
| | | | | 702/3 |
| 8,181,511 | B2 * | 5/2012 | Meier | G01W 1/00 |
| | | | | 702/2 |
| 2010/0088074 | A1 * | 4/2010 | Koller | G06N 3/0445 |
| | | | | 703/2 |
| 2010/0191468 | A1 * | 7/2010 | Schuck | G01W 1/10 |
| | | | | 702/2 |
| 2013/0218353 | A1 * | 8/2013 | San Andres | H02J 1/10 |
| | | | | 700/286 |
| 2013/0221951 | A1 * | 8/2013 | Anderson | G01R 33/007 |
| | | | | 324/207.11 |
| 2015/0325130 | A1 * | 11/2015 | Baek | G08G 5/0013 |
| | | | | 701/14 |
| 2017/0023702 | A1 * | 1/2017 | Smyth | G01W 1/02 |
| 2017/0276507 | A1 * | 9/2017 | Zacharenko | G01C 21/3694 |
| 2018/0120449 | A1 * | 5/2018 | Savani-Patel | G01T 1/16 |

* cited by examiner

*Primary Examiner* — Mark D Featherstone
*Assistant Examiner* — Kweku William Halm
(74) *Attorney, Agent, or Firm* — Christopher O. Edwards; Bryan A. Geurts; Helen M. Galus

(57) ABSTRACT

The disclosed subject matter relates to a database and systems associated therewith for space weather data (code name DONKI for Database of Notification, Knowledge, Information) relating to various space weather phenomena or phenomenon, such as, for example, solar flare, solar energetic particle, coronal mass ejection, interplanetary shock, magnetopause crossing, geomagnetic storm, radiation belt enhancement and high speed stream.

8 Claims, 16 Drawing Sheets

| Event Type | Start Time (UT) | Associated Instrument | Peak Time | End Time | Class | Source Location | Active Region Number | Directly Linked Event(s) |
|---|---|---|---|---|---|---|---|---|
| Solar Flare | 2010-04-03 09:04 | GOES14: SEM/XRS 1.0-8.0 | 2010-04-03T09:54Z | 2010-04-03T10:58Z | B7.4 | S25W03 | 11059 | 2010-04-03T09:54:00-CME-001 ← 318 |

FIG. 3D

| Event Type | Event Time (UT) | Associated Instrument | Directly Linked Event(s) |
|---|---|---|---|
| Solar Energetic Particle | 2010-08-14 12:30 | GOES13: SEM/EPS >10 MeV | 2010-08-14T09:38:00-FLR-001 FLR Type: C4.4 |

FIG. 3E

| Event Type | Event Time (UT) | Catalog | Location | Associated Instrument | All Detecting Instruments | Directly Linked Event(s) |
|---|---|---|---|---|---|---|
| Interplanetary Shock | 2010-01-29 20:29 | SWRC_CATALOG | STEREO B | STEREO A: IMPACT | STEREO A: IMPACT STEREO A: PLASTIC | |

FIG. 3F

| Event Type | Event Time (UT) | Associated Instrument | Directly Linked Event(s) |
|---|---|---|---|
| Magnetopause Crossing | 2010-12-28 14:00 | MODEL: SWMF | 2010-12-23T05:24:00-CME-001 |

FIG. 3G

| Event Type | Start Time (UT) | DST Min | Kp Index | Directly Linked Event(s) |
|---|---|---|---|---|
| Geomagnetic Storm | 2010-04-05 12:00 | | NOAA Kp: 7 (2010-04-05T12:00Z) | |

FIG. 3H

| Event Type | Event Time (UT) | Associated Instrument | Directly Linked Event(s) |
|---|---|---|---|
| Radiation Belt Enhancement | 2010-07-29 13:20 | GOES13: SEM/EPS >0.8 MeV | 2010-07-26T19:42:00-HSS-001 |

FIG. 3I

| Event Type | Event Time (UT) | Associated Instrument | All Detecting Instruments | Directly Linked Event(s) |
|---|---|---|---|---|
| High Speed Stream | 2013-06-20 06:00 | ACE: SWEPAM | ACE: SWEPAM<br>ACE: MAG | 2013-06-24T15:40:00-RBE-001 |

FIG. 3J

Generate Report for all WSA-ENLIL+Cone Inputs
Generate Report for WSA-ENLIL+Cone Most Accurate Inputs Only

| Model Name | Model Completion Time | AU | CME Input(s) | Predicted Earth Impact | Predicted Other Location(s) Impact |
|---|---|---|---|---|---|
| WSA-ENLIL+Cone | 2010-04-05T00:00Z | 2.0 | • CME: 2010-04-03T09:54:00-CME-001 ( CME Analysis ) | Earth Shock Arrival Time = 2010-04-05T10:37Z<br>Duration of disturbance (hr) = 4.2<br>Minimum magnetopause standoff distance: Rmin(Re) = 4.5<br>Possible Kp index:<br>(kp)90=3<br>(kp)135=5<br>(kp)180=6 | STEREO A: 2010-04-05T19:00Z<br>Mars: 2010-04-07T11:00Z |

FIG. 3K

| Event Type | Start Time (UT) | Catalog | All Detecting Instruments | Source Location |
|---|---|---|---|---|
| CME | 2010-04-03 09:54 | SWRC_CATALOG | STEREO A: SECCHI/COR2 SOHO: LASCO/C2 SOHO: LASCO/C3 STEREO B: SECCHI/COR2 | S20E05 |

FIG. 3L

CME Analysis

| Event Type | Catalog | Data Level | Prime? | Long | Lat | Speed | Type | Half Width | Time 21.5 | WSA-ENLIL+Cone Result(s) |
|---|---|---|---|---|---|---|---|---|---|---|
| CME Analysis | SWRC_CATALOG | 0 | true | 8.0 | 7.0 | 620.0 | C | 26.0 | 2010-04-03T17:16Z | Result 1 (2.0 AU) Earth = 2010-04-05T10:37Z (PE: 2.7 h) STEREO A = 2010-04-05T19:00Z Mars = 2010-04-07T11:00Z |
| CME Analysis | SWRC_CATALOG | 0 | false | 3.0 | -25.0 | 797.0 | C | 32.0 | 2010-04-03T14:11Z | Not modeled |

FIG. 3M

Coronal Mass Ejection
Catalog: SWRC_CATALOG
Start Time: 2010-04-03T09:54Z ( STEREO A: SECCHI/COR2 )
All Detecting Spacecrafts:
    STEREO A: SECCHI/COR2
    SOHO: LASCO/C2
    SOHO: LASCO/C3
    STEREO B: SECCHI/COR2
Activity ID: 2010-04-03T09:54:00-CME-001 (version 1)
Source Location: S28E05
Note: SDO images were unavailable. CME source location determined using SOHO EIT 195. Significant dimming at time of eruption followed by post eruption arcades.
Submitted on 2015-06-17T19:47Z by Alessandro Weld No Notification has been sent for this activity yet.

The List of CME Analysis already entered:

| Event Type | Catalog | Data Level | Prime? | Long | Lat | Speed | Type | Half Width | Time 21.5 | Note | WSA-ENLIL+Cone Result(s) | Submitted By |
|---|---|---|---|---|---|---|---|---|---|---|---|---|
| CME Analysis | SWRC_CATALOG | 0 | true | 3.0 | 7.0 | 629.0 | C | 26.0 | 2010-04-03T17:16Z | | 1: Result 1 (2.0 AU) Earth = 2010-04-05T16:57Z (PE: 2.7 h) STEREO A = 2010-04-05T19:00Z Mars = 2010-04-07T11:00Z | Alessandro Weld on 2015-06-17T19:52Z |
| CME Analysis | SWRC_CATALOG | 0 | false | 3.0 | -25.0 | 797.0 | C | 32.0 | 2010-04-03T14:11Z | Measured with swpc_cat | Not modeled | Alessandro Weld on 2015-06-17T19:48Z |

All directly linked activities:
2010-04-03T09:54:00-FLR-001
FLR Type: B7.4
2010-04-05T07:54:00-IPS-001
Location: Earth

FIG. 3N

SPACE WEATHER DATABASE

FIELD OF THE INVENTION

This invention relates to a space weather Database for knowledge collection, alert notification and information dissemination (DONKI) system.

BACKGROUND

Space weather refers to varying conditions within outer space, for example, our solar system, and may include phenomena such as, for example, solar flares, coronal mass ejections (CMEs), solar energetic particles, and geomagnetic storms. Space weather is different from the terrestrial weather that occurs in the Earth's atmosphere (such as the troposphere and stratosphere).

In the mid to late 20th century as well as today, the importance of space weather has increased because of the many military, commercial and scientific systems and vehicles that can be affected, adversely or otherwise, by space weather. Such systems can include earth orbital unmanned space craft including, for example, communications satellites systems, weather satellites and Global Positioning System (GPS) satellites as well as manned space craft including, for example, the International Space Station. Space weather phenomena can pose a threat to such spacecrafts by, for example, interfering with or damaging the communication signals with the spacecraft, interfering with or damaging the operation of equipment in the spacecraft or, with manned space craft, having an adverse biological or medical affect on the human inhabitants of the spacecraft. Space weather phenomena can also have a deleterious effect on electrical equipment on earth such as radar and long distance transmission lines as well as result in radiation exposure to passengers and crew of aircraft within the atmosphere, especially those traveling via the polar routes.

Some space weather events can have an effect of other space weather events. For example, space weather can be affected by solar wind and the interplanetary magnetic field (IMF) carried by the solar wind plasma and coronal mass ejections and the accompanying shock waves may compress the magnetosphere, trigger geomagnetic storms and accelerate solar energetic particles (SEP). The latter, accelerated by coronal mass ejections or solar flares, can damage spacecraft electronics and threaten the health of astronauts onboard.

Current means of monitoring space weather activity, such as blogs, can be difficult, if not impossible to search as well as problematic to describe and track a chain of related space weather events.

There is a need for cataloging space weather phenomenon and events, disseminating forecasts and notifying and archiving event-focused information including linkages, relationships and cause-and-effects between space weather phenomena events and activity.

BRIEF DESCRIPTION

In one embodiment, a Database of Notification, Knowledge, Information (DONKI) system for space weather is provided. The (DONKI) system includes a DONKI database configured to store text and graphic space weather data including at least one of obtained data, data analysis and data modeling of a space weather phenomenon; a DONKI control system in telecommunication with the DONKI database and configured to extract filtered space weather data from the DONKI database; and a workstation in telecommunication with the DONKI control system and configured to receive and display the extracted filtered space weather data.

In another embodiment, a Database of Notification, Knowledge, Information (DONKI) system for space weather is provided. The (DONKI) system includes a DONKI database configured to store text and graphic space weather data including at least one of obtained data, data analysis and data modeling of a space weather phenomenon, the space weather phenomenon including solar flare, solar energetic particle, coronal mass ejection, interplanetary shock, magnetopause crossing, geomagnetic storm, radiation belt enhancement and high speed stream and the space weather data modeling including WSA-ENLIL+cone model data; a DONKI control system in telecommunication with the DONKI database and configured to extract filtered space weather data from the database; and a workstation in telecommunication with the DONKI control system; and a telecommunication network system configured to provide telecommunication between the DONKI control system and the workstation. The workstation is configured to allow a user to enter space weather data into the workstation and transmit the entered space weather data to the DONKI control system, wherein the DONKI control system is further configured to transmit the entered space weather data to the DONKI database, to allow a user to enter filter criteria and transmit the entered filter criteria to the DONKI control system, wherein the DONKI control system is further configured to extract filtered space weather data from the DONKI database based on the entered filter criteria, and to receive and display the extracted filtered space weather data from the DONKI control system.

In another embodiment, a method of providing space weather data using a Database of Notification, Knowledge, Information (DONKI) system is provided. The DONKI system includes a DONKI database configured to store text and graphic space weather data including at least one of obtained data, data analysis and data modeling of a space weather phenomenon; a DONKI control system in telecommunication with the DONKI database and configured to extract filtered space weather data from the DONKI database; and a workstation in telecommunication with the DONKI control system and configured to receive and display the extracted filtered space weather data. The method includes providing space weather data to the DONKI database; extracting filtered space weather data from the DONKI database using the DONKI control system; and transmitting the extracted filtered space weather data from the DONKI control system to the workstation.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3D illustrates an exemplary display of the results of a search for solar flare space weather activity;

FIG. 3E illustrates an exemplary display of the results of a search for solar energetic particle weather activity;

FIG. 3F illustrates an exemplary display of the results of a search for interplanetary shock space weather activity;

FIG. 3G illustrates an exemplary display of the results of a search for magnetopause crossing space weather activity;

FIG. 3H illustrates an exemplary display of the results of a search for geomagnetic storm space weather activity;

FIG. 3I illustrates an exemplary display of the results of a search for radiation belt enhancement space weather activity;

FIG. 3J illustrates an exemplary display of the results of a search for high speed stream space weather activity;

FIG. 3K illustrates an exemplary display of the results of a search for WSA-ENLIL+cone model data of space weather activity;

FIG. 3L illustrates an exemplary display of the results of a search for coronal mass ejection space weather activity;

FIG. 3M illustrates an exemplary display of the results of further analysis of the coronal mass ejection in FIG. 3L;

FIG. 3N illustrates an exemplary display of the results of the coronal mass ejection space weather activity connected to the solar flare display results in FIG. 3D;

DETAILED DESCRIPTION

The present disclosure relates to a database and systems associated therewith for space weather data (code name DONKI for Database of Notification, Knowledge, Information) relating to various space weather phenomena or phenomenon, such as, for example, solar flare, solar energetic particle, coronal mass ejection, interplanetary shock, magnetopause crossing, geomagnetic storm, radiation belt enhancement and high speed stream. The DONKI system can provide information, such as for example, (1) chronicles of the daily interpretations of space weather observations, analysis, models, forecasts and notifications provided by the Space Weather Research Center (SWRC); knowledge-base search functionality to support anomaly resolution and space science research, linkages, relationships, cause-and-effects between space weather activities and phenomena; and access (for example, through various available online or API webservice access) to information stored on the DONKI system. The resulting benefits can include a one-stop tool (for example an on-line tool) for space weather forecasters and a single receptacle to gather and organize space weather scientists interpretations and daily activities with correlations and direct links relationships between relevant space weather observations that can enable remote participation by students, world-wide partners and model and forecasting technique developers. Furthermore, public users can search/view data already stored on the DONKI system and certain designated users (e.g., registered or preferred users) can enter and make comments on any space weather activity as well as enter space weather data into the DONKI system.

The DONKI system may provide comprehensive search functionality to support anomaly (e.g., space weather phenomenon) resolution and space science research including, for example, a space weather activity archive of space weather phenomena (such as, for example, flares, CME parameters and simulation results, SEPs, geomagnetic storms, radiation belt enhancements) with links between related space weather events, activities and phenomena and a Goddard Space Flight Center (GSFC) space weather notification and weekly report archive.

The DONKI system may be an on-line tool for the Space Weather science community. Generally, it may include a database backend and a web application front end. The database can be designed with modularity in mind, and the database design may be captured and stored in the CCMC Confluence, team collaboration software. The web application may include a model-view-controller (MVC) framework architecture. The MVC framework may follow the MVC architectural pattern to separate the data model and business rules from the user interface. Using such framework, it can allow modularize code to be written and promotes code reuse.

Figure 1:
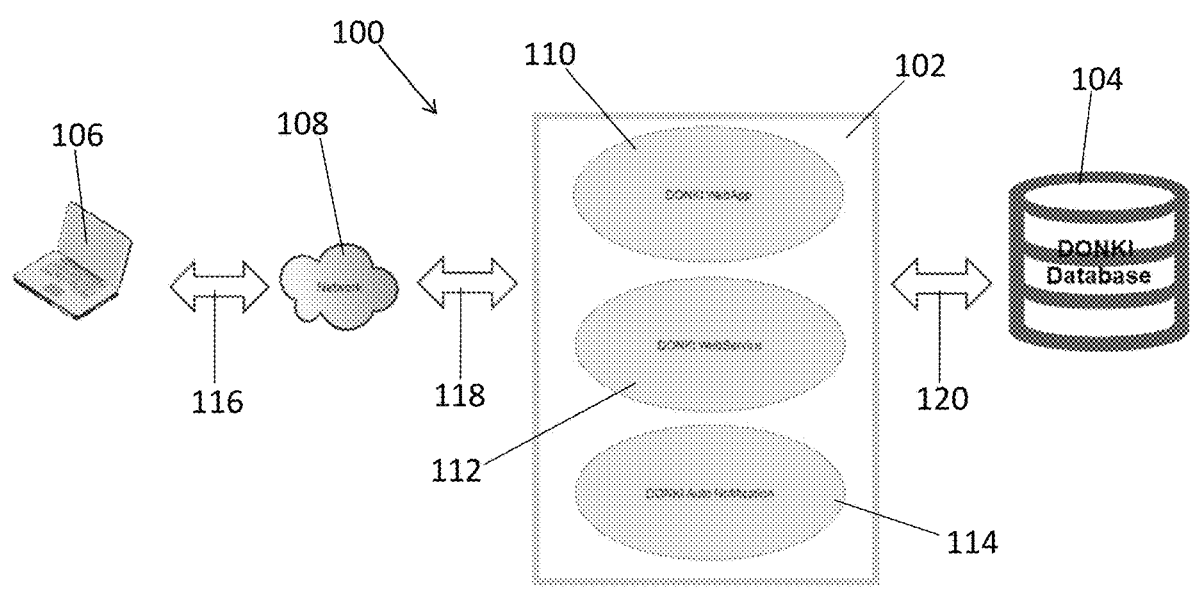
FIG. 1 illustrates an exemplary block diagram of an exemplary Database of Notification, Knowledge, Information (DONKI) system.

An embodiment of the DONKI system is shown in FIG. 1. DONKI system 100 includes a DONKI control system 102, a DONKI database 104, a workstation 106 and a telecommunication network system 108. In one embodiment, the DONKI control system 102 may include one or more processor-based components including a computing apparatus, such as a general purpose, an application specific computer or a server. The DONKI control system 102 may also include computer-readable memory elements, such as magnetic, electronic, or optical storage media, including, for example, hard-drive, disk, CD, DVD, flash memory and "cloud" memory, for storing programs and routines executed by the DONKI control system or by associated components of the overall system. The stored programs or modules may include programs routines for performing all or part of the embodiments of the present disclosure.

The stored programs or modules may include open source products such as Spring Framework (Java for web site development) available from the Apache Software Foundation; Hibernate Validator (used to enter data pertaining to a space weather phenomena to be stored in the system and checks for data validity) available from the Apache Software Foundation; Apache Tiles (a template engine) available from the Apache Software Foundation; Free Marker (a template engine) available from the Apache Software Foundation and Jackson, JSON library for Java (a Java-based library to serialize or map Java Objections to JSON and vice versa) available from the Apache Software Foundation.

DONKI control system 102 may also include additional stored programs or modules including DONKI Web App 110, DONKI Web Service 112 and DONKI Auto Notification 114. DONKI Web App 110 is a front-end user interface for forecasters to enter in all space weather event information, link events to each other, and send notifications to NASA mission operators. It also allows users to browse and search all information stored in the database via the web app. DONKI Web Service 112 is a set of publicly accessible Web Application Program Interface (API) allowing other applications to obtain information stored in the DONKI database via simple representational state transfer (REST) based communications. DONKI Auto Notification 114 performs the auto notification feature for the DONKI system. It receives space environment information from the integrated Space Weather Analysis System (iSWA) and monitor different thresholds for them. Once a threshold has been crossed, it would send out a notification automatically to NASA mission operators about it.

The DONKI control system 102 may include processor components (such as, for example, a text and graphics processor) to insert into and retrieve from the DONKI database 104 space weather data and other recorded information including, for example, text, graphics and pictures. Also included is a DONKI database 104 for storing information used in the DONKI system, for example, space weather data related to a space weather phenomena entered into the DONKI system. The DONKI database 104 may include computer-readable memory elements, such as magnetic, electronic, or optical storage media to record data, including, for example, hard-drive, disk, CD, DVD, flash memory, "cloud" memory and combinations thereof. The DONKI control system 102 and DONKI database 104 may integrated into the same computing apparatus or be separate units in which the two are in telecommunication with each other using, for example, a wired network, a local access network (LAN), a wide area network (WAN), the Internet, a wireless network (e.g., cellular communication and WIFI communication) and combinations thereof.

Telecommunication network system 108 can be used as an interface between workstation 106 and DONKI control system 102. Suitable telecommunication network systems can include, for example, a wired network, a local access network (LAN), a wide area network (WAN), the Internet (including Application Programming Interface (API) web service), a wireless network (e.g., cellular communication and WIFI communication), other communication networks and combinations thereof.

In FIG. 1, double-headed arrow 116 indicates the flow of information in both directions between workstation 106 and telecommunication network system 108, double-headed arrow 118 indicates the flow of information in both directions between DONKI control system 102 and telecommunication network system 108 and double-headed arrow 120 indicates the flow of information in both directions between DONKI control system 102 and DONKI database 104.

A communication network may be an interconnection of devices capable of communicating (e.g., transmitting and receiving data, speech, etc.) with other devices to which the communication network is connected. A communication between two devices connected through the network may be made through a communication route of links connecting the two devices. For example, in a communication between a first device and a second device, a communication route may refer to a series of links which connect the first and second devices. A "link" may refer to a connection, a transferred signal, etc., and depending on the configuration of the network, links may be made between any communication devices connected to the network or between devices and other nodes or controllers connected to the network.

The workstation 106 may, for example, allow for the input of information (such as, for example, a search request or data related to a new space weather phenomena being entered into the DONKI system) or receipt of information (such as, for example, the results of a search request or data related to a space weather phenomena already entered into the DONKI system). The workstation is in telecommunication with the DONKI control system and may include one or more processor-based components including a computing apparatus, such as a general purpose or application specific computer including, for example, a main frame computer, a desktop computer and various mobile devices such as a laptop computer, a tablet computer, a personal digital assistant and a Smartphone. The work station may also include various memory and/or storage components including magnetic and optical mass storage devices and internal memory, such as ROM, RAM, flash memory, hard disk and removable media. Programs and routines for performing the embodiments of the present disclosure may be stored using such memory and/or storage components included in the workstation or by associated components of the DONKI system, including a computer accessible storage and/or memory accessible by network and/or communication interfaces present on the computer. The one or more processor-based components may also comprise various input/output (I/O) interfaces (including wires, lines, or suitable wireless interfaces (including WIFI, Bluetooth or cellular telephone interfaces) and various network or communication interfaces including local and wide area intranets and storage networks as well as the Internet to allow for communication with various user interface devices, including, for example, a display, keyboard, mouse and printer as well as the telecommunication network system 108 and the resulting connection to the rest of DONKI system. The display may include a screen or other devices to provide a visual image and, may also include a touch screen that may operate as an input device as well. Such interfaced devices may be used for viewing and inputting information and/or search criteria for operating the DONKI system.

More than a single operator workstation may be provided for the DONKI system. Also, some workstations may be dedicated to specific tasks related to the system. For example, an data station may include a workstation which permits the input of data related to space weather phenomena into the DONKI database 104 through the DONKI control system 102, whereas a different workstation may be provided for retrieving data about space weather phenomena from the DONKI database 104 through the DONKI control system 102.

The workstation 106 in cooperation with the telecommunication network system 108 allows for communication between the other components of the DONKI system, including other workstations that are part of the DONKI system, via a wired network, a local access network (LAN), a wide area network (WAN), the Internet (including Application Programming Interface (API) web service), a wireless network (e.g., cellular communication and WIFI communication) and combinations thereof.

Figure 2:
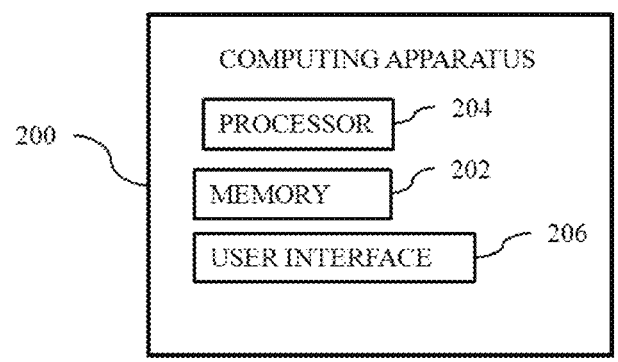
FIG. 2 illustrates a block diagram of an exemplary computing apparatus.

In at least one aspect of the disclosed embodiments, the systems, components and methods disclosed herein may be executed by one or more computers or processor-based components or apparatus under the control of one or more programs stored on computer readable medium, such as a non-transitory computer readable medium. FIG. 2 shows a block diagram of an exemplary computing apparatus 200 that may be used to practice aspects of the disclosed embodiments. In at least one exemplary aspect, the control system circuitry, data acquisition system circuitry, data processing system circuitry, operator workstation and other disclosed devices, components and systems may be implemented using an instance or replica of the computing apparatus 200 or may be combined or distributed among any number of instances or replicas of computing apparatus 200.

The computing apparatus 200 may include computer readable program code or machine readable executable instructions stored on at least one computer readable medium 202, which when executed, are configured to carry out and execute the processes and methods described herein, including all or part of the embodiments of the present disclosure. The computer readable medium 202 may be a memory of the computing apparatus 200. In alternate aspects, the computer readable program code may be stored in a memory external to, or remote from, the apparatus 200. The memory may include magnetic media, semiconductor media, optical media, or any media which may be readable and executable by a computer. For example, computer readable medium in one embodiment may also include all or some of the DONKI database 104. Computing apparatus 200 may also include a processor 204 for executing the computer readable program code stored on the at least one computer readable medium 202. In at least one aspect, computing apparatus 200 may include one or more input or output devices to allow communication among the components of the DONKI system, including, for example, what may be generally referred to as a user interface 206, such as, for example, the workstation 106 described above, which may operate the other components included in the DONKI system or to provide input or output from the computing apparatus 200 to or from other components of the DONKI system.

Information entered into, stored in and retrievable from the DONKI database 104 of the DONKI system via, for example, workstation 106 can include space weather data including occurrences of space weather phenomenon or phenomena as well as instrument obtained data, data analysis of the instrument obtained data and data modeling related to a space weather phenomenon or phenomena occurrence to create a catalog of space weather data, chronicles of the daily interpretations of space weather observations, simulation results, forecasting analysis, and notifications of space weather activity.

Notification alerts of space weather activity can also be provided through the DONKI system to those users (e.g., registered users) with access to a workstation, in particular, those users who indicate their interest in receiving such alerts. Such alerts can be generated by the DONKI control system based on criteria established by a user using one workstation (including specific types of space weather phenomena or certain space weather phenomena whose data exceeds user established data thresholds) including the space weather phenomenon data entered and designation of the space weather phenomenon data for an alert notification. Such a space weather phenomenon data and alert notification can be sent by the user using the one workstation to the DONKI control system that can, in turn and store it in the DONKI database. The DONKI control system also can transmit the space weather phenomenon data and alert notification sent by the user to other workstations in the DONKI system, preferably upon receipt by DONKI control system of the space weather phenomenon data and alert notification, because time may be of the essence in alerting other users of the DONKI system of the impending danger of a space weather phenomenon that has occurred. The occurrence of a space weather phenomenon may affect the operation of equipment or facilities located on earth, in or near earth orbit or elsewhere in the solar system, including, for example, NASA being alerted to space weather phenomena that could affect the International Space Station or other manned spacecraft or missions as well as satellites and ground facilities and equipment as well as telecommunication companies, government agencies (including, for example, the U.S. military and Defense Department, Central Intelligence Agency, Homeland Security and other federal, state and local government organizations) and other private companies that need to be alerted to space weather phenomena that could affect satellites or other equipment as well as ground communication facilities and equipment.

Another embodiment may include the DONKI database 104 including information on space weather phenomena that are caused or affected by a previously occurring space weather phenomena. For example, the occurrence of a solar flare may be connected or linked to the occurrence of a coronal mass ejection.

Another embodiment may include the DONKI database including additional data that is entered into or calculated based on obtained data directly related to space weather phenomenon.

An embodiment of the DONKI database may store data under one or more libraries or catalogues. The libraries or catalogues may group space weather data by different categories including, for example, the type of space weather phenomenon (e.g., solar flare, solar energetic particle, coronal mass ejection, interplanetary shock, magnetopause crossing, geomagnetic storm, radiation belt enhancement, high speed stream and WSA-ENLIL+cone model), the source of the obtained data of the space weather phenomenon (e.g., the name of the user or researcher by name (for example, Jang et al.) or organization name, for example, the SWRC (Space Weather Research Center) library)) or data of space weather phenomenon where a notification alert has been issued.

An embodiment may include multiple data points for each of space weather phenomenon entered into, maintained and searchable in the DONKI database 104. For example, for each of the space weather phenomena listed below, the data points may be one or more of those that are listed.

Solar flare data may include the start time, the associate instrument that identified the event, the peak time, the end time, the class, the source location, the active region number and directly linked space weather phenomena or events.

Solar energetic particle data may include the event time, the associate instrument that identified the event and space weather phenomena or events.

Coronal mass ejection (CME) data may include the start time, the catalogue or library where the data in located, the detecting instrument(s), the source location and CME analysis. The CME analysis that can be calculated based on data obtained may include the catalogue or library where the data in located, the data level, whether it is "Prime" (This is used to indicate whether the CME Analysis info is being used as the primary measurement for the CME. Forecasters can make multiple measurements of the CME based on available data. Later, they can decide which measurement is the 'most accurate' and make that the primary measurement of the CME), solar heliographic longitude (degrees), solar heliographic latitude (degrees), the Speed (km/s), the type, the half angular width (degrees), the "Time at 21.5" and the WSA-ENLIL+cone model result(s).

Interplanetary shock data may include the event time, the catalogue or library where the data in located, the associate instrument that identified the event, all detecting instruments and directly linked space weather phenomena or events.

Magnetopause crossing data may include the event time, the associate instrument that identified the event and directly linked space weather phenomena or events.

Geomagnetic storm data may include the start time, DST min. (this is a 1-minute time resolution storm-time disturbance index), Kp Index (this is the global geomagnetic storm index and is based on 3-hour measurements of the K-indices. The K-index quantifies disturbances in the horizontal component of earth's magnetic field with an integer in the range 0-9 with 1 being calm and 5 or more indicating a geomagnetic storm) and directly linked space weather phenomena or events.

Radiation belt enhancement data may include the event time, the associate instrument that identified the event and directly linked space weather phenomena or events.

High speed stream shock data may include the event time, the associate instrument that identified the event, all detecting instruments and directly linked space weather phenomena or events.

WSA-ENLIL+cone model data may include the model completion time, AU (Astronomical Unit (AU) is the average distance between Earth and the Sun which is ~93 million miles or 150 million kilometers), CME inputs (this is the CME Analysis info measured by the forecaster (i.e. speed, latitude, longitude, half-angle, time21.5), predicted earth impact and predicted other location(s) impact. WSA-Enlil is a large-scale, physics-based prediction model of the heliosphere, used by Space Weather forecasters to provide 1-4 day advance warning of solar wind structures and CMEs that cause geomagnetic storms. The model is named after Wang-Sheeley-Arge (WSA), three important scientists in space weather, and the Sumerian god of winds and storms (EN-LIL). The ENLIL cone model forecasts CME propagation from the ENLIL inner boundary Time occurrences, such as, for example, event time or start time may include the date (day, month and year) and the time in hours and minutes (either in 12 hour basis with AM or PM or 24 hour basis).

Figure 3A:
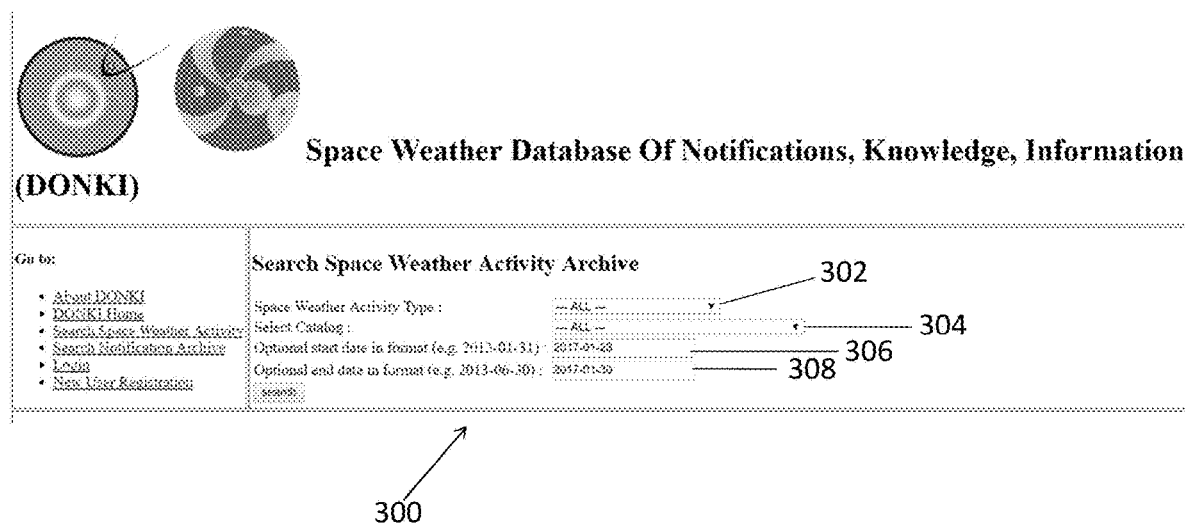
FIGS. 3A-3C illustrate exemplary search screens to search a space weather activity archive.
Figure 3B:
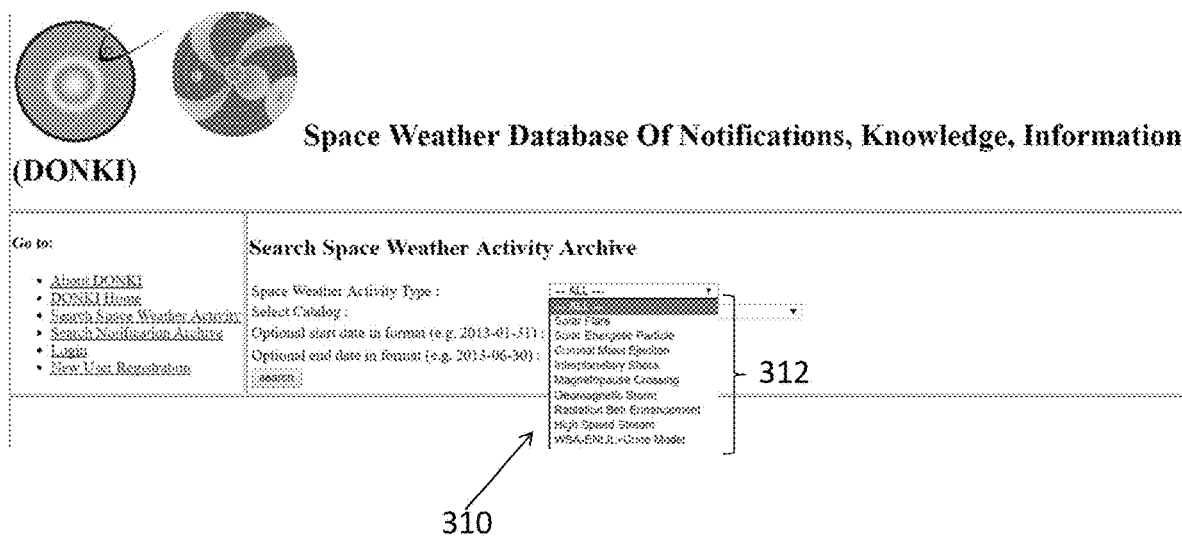
Figure 3C:
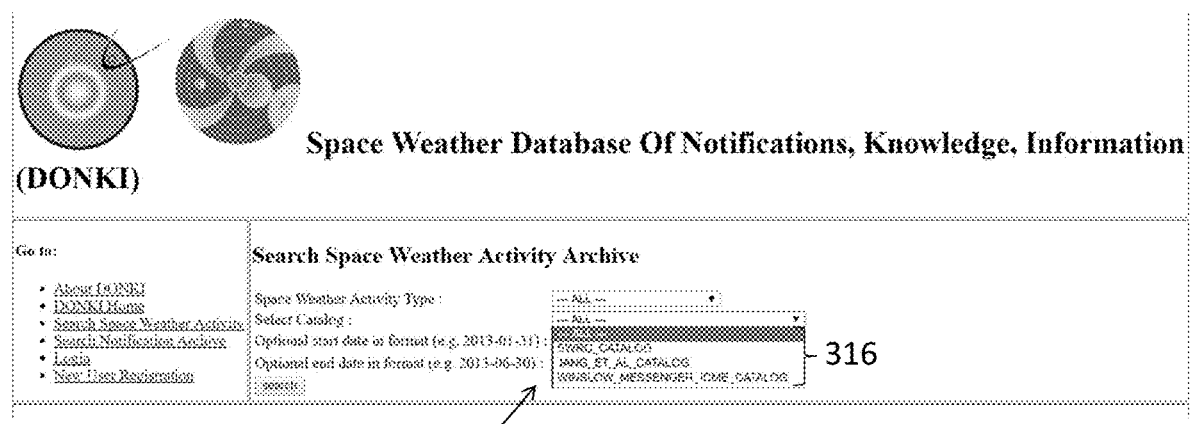

An embodiment may include a search screen to search a space weather activity archive such as that included in FIG. 3A that provides a template 300 to aid a user in creating a filter criteria for searching for space weather activity information in the DOKI system archive of space weather activity occurrences stored in the DONKI system with the results being displayed, for example, on work station 106. FIG. 3A includes four fields: Space Weather Activity Type 302, Select Catalogue 304, Start Date 306 and End Date 308. Space Weather Activity Type 302 may include a dropdown menu 310 of various space weather phenomena 312 as shown in FIG. 3B that allows the user to select using a cursor which specific space weather phenomena (e.g., one or all) the user desires to search. Select Catalogue 304 may include a dropdown menu 314 of different database libraries or catalogues 316 as shown in FIG. 3C that allows the user to select using a cursor which specific space weather catalogue (e.g., one or all) the user desires to search. Start Date 306 and End Date 308 allows the user to focus the search to a specific time period by date or to leave these fields blank so as not to designate a specific time period.

An embodiment may include display of the results of search a space weather activity archive and include a table for each of the specific space weather phenomena and associated data related to each such space weather phenomena event or occurrence. The results may be in tabular form of columns and rows and may include one or more instances of a space weather phenomenon or multiple space weather phenomena resulting from the search and may be downloadable as well. If there is more than one result included in the tabular form, the information can be sorted by each column. For example, FIG. 3D includes the data for a solar flare including the event type, the start time, the associate instrument that identified the event, the peak time, the end time, the class, the source location, the active region number and any directly linked space weather phenomena or events; FIG. 3E includes the data for a solar energetic particle including the event type, the event time, the associate instrument that identified the event and any directly linked space weather phenomena or events; FIG. 3F includes the data for an interplanetary shock including the event type, the event time, the catalogue or library where the data in located, the associate instrument that identified the event, all detecting instruments and any directly linked space weather phenomena or events; FIG. 3G includes the data for a magnetopause crossing including the event type, the event time, the associate instrument that identified the event and any directly linked space weather phenomena or events; FIG. 3H includes the data for a geomagnetic storm including the event type, the start time, DST min., Kp Index and any directly linked space weather phenomena or events; FIG. 3I includes the data for a radiation belt enhancement including the event type, the event time, the associate instrument that identified the event and any directly linked space weather phenomena or events; FIG. 3J includes the data for a high speed stream including the event type, the event time, the associate instrument that identified the event, all detecting instruments and any directly linked space weather phenomena or events; FIG. 3K includes the data for a WSA-ENLIL+cone model including the model name, the model completion time, AU, CME inputs, predicted earth impact and predicted other location(s) impact; and FIG. 3L includes the data for a coronal mass ejection (CME) including the event type, the start time, the catalogue or library where the data in located, the detecting instrument(s), the source location. Further analysis of the CME may also be included such as, for example, the catalogue or library where the data in located, the data level, whether it is "Prime", Longitude (degrees), Latitude (degrees), the Speed (km/s), the type, the half angular width (degrees), the "Time at 21.5" and the WSA-ENLIL+cone model result(s).

Some of the information in the table, for example, any "directly linked events" may include a hyperlink (e.g., a link from a hypertext file or document to another location or file, typically activated by clicking on a highlighted word or image on the screen) to information and data pertaining to those linked events. An embodiment may include such a hyperlink to the data of a linked event such as is shown, for example in FIG. 3N where the solar flare in FIG. 3D is a directly linked event via hyperlink 318 in FIG. 3D to the CME of FIG. 3N.

Figure 4A:
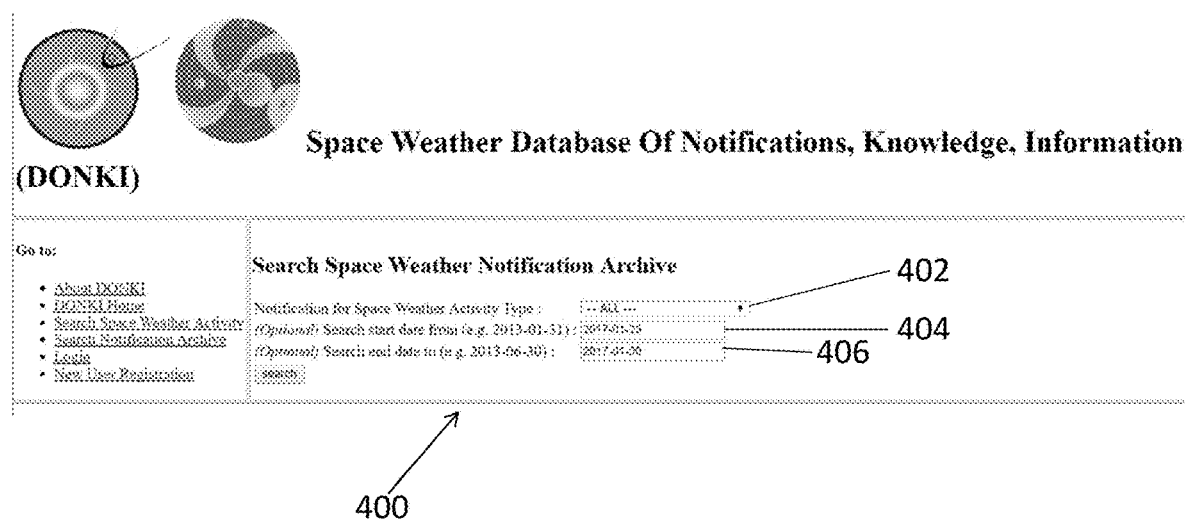
FIGS. 4A-4B illustrate exemplary search screens to search a space weather activity notification archive.
Figure 4B:
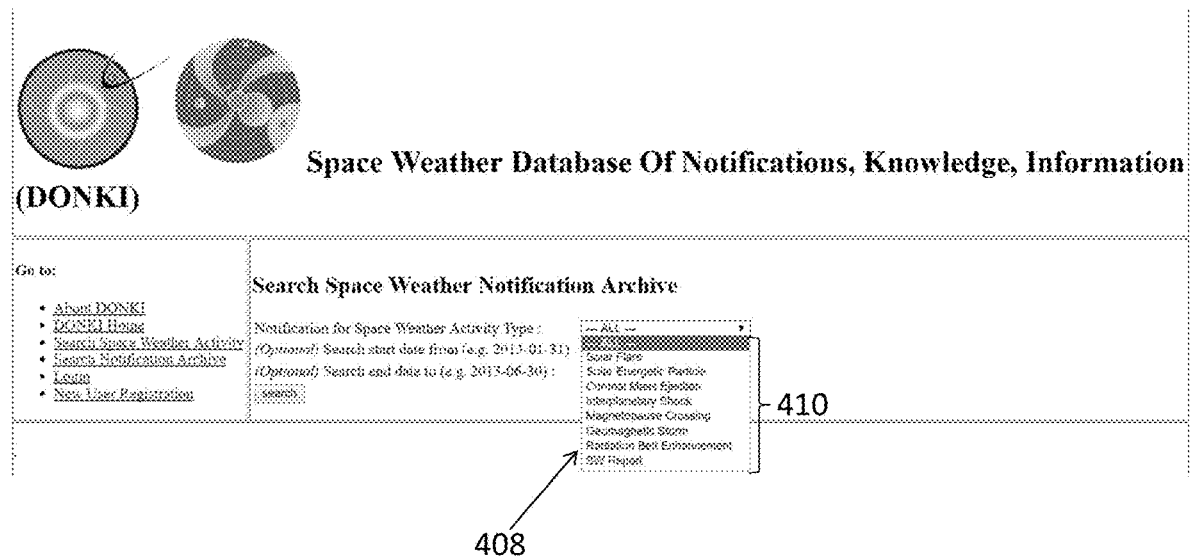

Another embodiment may include a search screen to search a space weather activity notification archive such as that included in FIG. 4A that provides a template 400 to aid a user in creating a filter criteria for searching for space weather activity notification alert information in the DOKI system archive of space weather activity occurrences stored in the DONKI system where an alert notification was sent with the results being displayed, for example, on work station 106. FIG. 4A includes three fields: Notification of Space Weather Activity Type 402, Search Start Date From 404 and Search End Date To 406. Notification of Space Weather Activity Type 402 may include a dropdown menu 408 of various space weather phenomena 410 as shown in FIG. 4B that allows the user to select using a cursor which specific space weather phenomena (e.g., one or all) the user desires to search. Search Start Date From 404 and Search End Date To 406 allows the user to focus the search to a specific time period by date or to leave these fields blank so as not to designate a specific time period.

Figure 4C:
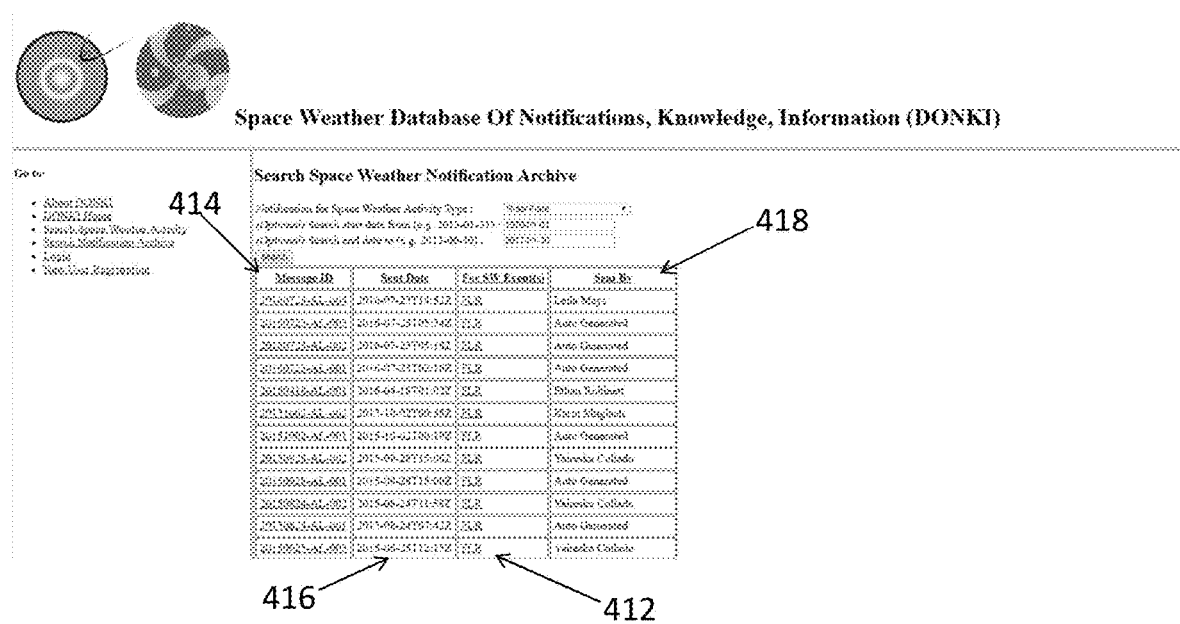
FIG. 4C illustrates an exemplary display of the results of a search of a space weather activity notification archive.
Figure 4D:
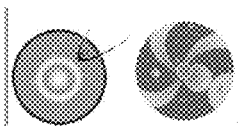
FIG. 4D illustrates an exemplary display of the notification information connected to the space weather activity notification archive results via the "message ID" number hyperlink in FIG. 4C.
Figure 4E:
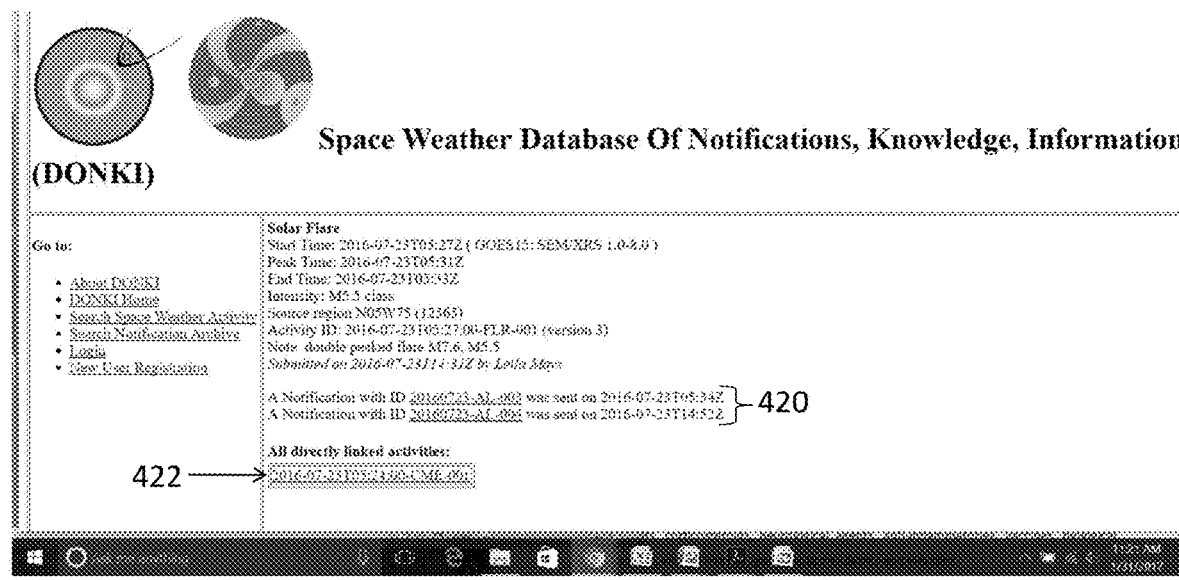
FIG. 4E illustrates an exemplary display of a report on the space weather event connected to the space weather activity notification archive results via the "For SW event(s)" name hyperlink in FIG. 4C.

An embodiment may display the results including, for example, a table shown in FIG. 4C, listing each of alert notifications of the specific space weather phenomena identified in the column labeled "For SW event(s)." The results may be in tabular form of columns and rows and may include one or more instances of a space weather alert notification resulting from the search and may be downloadable as well. If there is more than one result included in the tabular form, the information can be sorted by each column. The specific space weather phenomena identified in the column labeled "For SW event(s)" 412 is FLR, the abbreviation for a solar flare. The table in FIG. 4C also includes the "message ID" number 414 for the alert notification, the "Sent Date" 416 of the alert notification and the "Sent by" 418 identifying the person who sent the alert notification. The "message ID" number for the alert notification in the table may also provide a hyperlink so that when clicked on by workstation cursor provides a copy of the notification alert and the detail included therein as shown, for example, in FIG. 4D. The "For SW event(s)" for FLR in the table may also provide additional hyperlinks so that when clicked on by workstation cursor provides a copy of the report on the specific space weather phenomenon included in FIG. 4E, in this case, a solar flare, and data related to it including other alert notification related to it 420 and any directly linked space weather phenomena or events 422.

Underlining of information included in any of the FIGS. 3D-3D and FIGS. 4C-4E may indicate a hyperlink so that when clicked on by a workstation cursor there is provided a copy of a more detailed report on the specific space weather phenomenon viewable at the workstation by the user.

This written description uses examples as part of the disclosure, including the best mode, and also to enable any person skilled in the art to practice the disclosed implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A space weather Database of Notification, Knowledge, Information (DONKI) system, comprising
   a. a DONKI database configured to store text and graphic space weather data including at least one of obtained data, data analysis and data modeling of a space weather phenomenon with multiple data points for said space weather phenomenon;
   b. a DONKI control system in telecommunication with the DONKI database and configured to extract filtered space weather data from the DONKI database; and
   a workstation in telecommunication with the DONKI control system and configured to receive and display the extracted filtered space weather data, wherein the space weather data modeling includes WSA-EN-LIL+cone model data and a first workstation is further configured to allow a user to enter space weather data into the workstation, include an alert notification designation related to the entered space weather data and transmit the entered space weather data and alert notification designation to the DONKI control system and the DONKI control system is further configured to transmit entered space weather data and alert notification to a second workstation and to the DONKI database and wherein space weather data on a first space weather phenomenon includes a hyperlink to space weather data on a second space weather phenomenon; further wherein notification alerts of space weather activity are provided through the DONKI system to registered users through access to a workstation, who request such alerts based on criteria established by a user using one workstation where data exceeds user established data thresholds including the space weather phenomenon data entered and designation of the space weather phenomenon data for an alert notification wherein time is of the essence in alerting other users of the DONKI system to a space weather phenomenon that has occurred to allow forewarning of the occurrence of a space weather phenomenon which affects the operation of equipment or facilities located in one of on earth, and in earth orbit and elsewhere in the solar system, the space weather phenomenon including one of solar flare, solar energetic particle, coronal mass ejection, interplanetary shock, magnetopause crossing, geomagnetic storm, radiation belt enhancement, high speed stream space weather phenomena that affects the International Space Station or other manned spacecraft or missions as well as satellites and ground facilities and equipment and including information on space weather phenomena that are caused or affected by a previously occurring space weather phenomena, wherein the DONKI system is an on-line tool including a database backend and a web application front end for sending notification alerts of space weather activity to external users wherein Coronal mass ejection (CME) data includes a selection of the start time, the library where the data is located, the detecting instrument, the source location and CME analysis where the CME analysis is calculated based on data from the library where the data in located, the data level, and an indication of the CME Analysis importance wherein multiple measurements of the CME are made and a most accurate measurement is selected for use; and
   further wherein the DONKI database includes multiple data points for each of space weather phenomenon entered into, maintained and searchable for each of the space weather phenomena including storing data under one or more libraries with the libraries grouping space weather data by different categories including, the categories including the type of space weather phenomenon selected from solar flare, solar energetic particle, coronal mass ejection, interplanetary shock, magnetopause crossing, geomagnetic storm, radiation belt enhancement, high speed stream model, the source of the obtained data of the space weather phenomenon by name of the user, organization name, and previously issued data from space weather phenomenon where a notification alert has been issued.

2. The DONKI system of claim 1, wherein the workstation is further configured for a user to enter filter criteria and the DONKI control system is further configured to receive the filter criteria and use the filter criteria to extract the filtered space weather data from the DONKI database.

3. The DONKI system of claim 2, wherein the filter criteria includes the space weather phenomenon.

4. The DONKI system of claim 1, wherein the space weather phenomenon includes solar flare, solar energetic particle, coronal mass ejection, interplanetary shock, magnetopause crossing, geomagnetic storm, radiation belt enhancement and high speed stream.

5. The DONKI system of claim 1, wherein the workstation is further configured to allow a user to enter space weather data into the workstation and transmit the entered space weather data to the DONKI control system and the DONKI control system is further configured to transmit the entered space weather data to the DONKI database.

6. The DONKI system of claim 1, wherein the DONKI control system is further configured to transmit to the entered space weather data and alert notification to the second workstation upon receipt of the entered space weather data and alert notification from the first workstation.

7. The DONKI system of claim 1, wherein the workstation in telecommunication with the DONKI control system using a telecommunication network system.

8. The DONKI system of claim 7, wherein the telecommunication network system includes a wired network, a local access network (LAN), a wide area network (WAN), the Internet, a wireless network and combinations thereof.

* * * * *